UNITED STATES PATENT OFFICE.

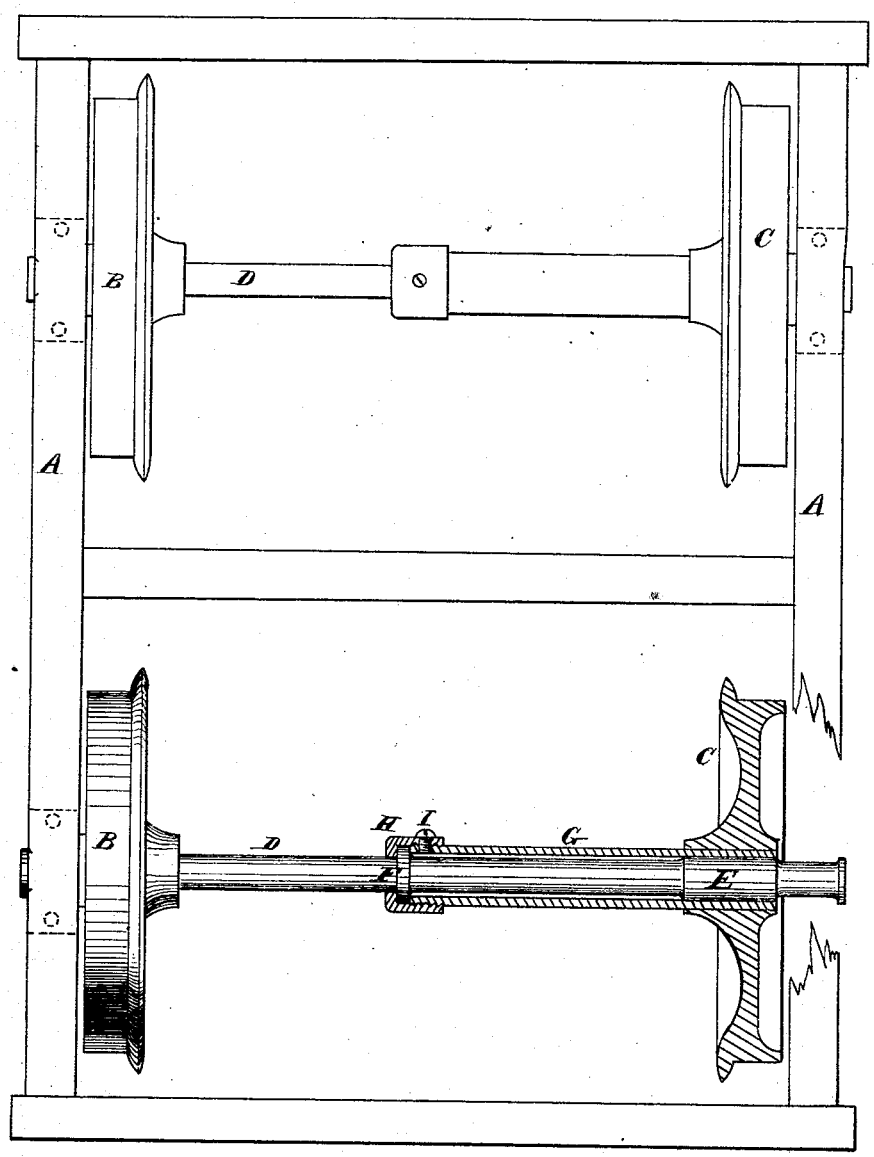

SAMUEL L. HARRISON, OF SAN FRANCISCO, CALIFORNIA, ASSIGNOR OF ONE-HALF HIS RIGHT TO DEBORAH I. PAXSON AND JOSEPH S. PAXSON, OF SAME PLACE.

IMPROVEMENT IN RAILWAY-CAR AXLES.

Specification forming part of Letters Patent No. 160,095, dated February 23, 1875; application filed August 7, 1874.

*To all whom it may concern:*

Be it known that I, SAMUEL L. HARRISON, of San Francisco, in the county of San Francisco and State of California, have invented an Improvement in Compensating-Axles for Railway Cars and Carriages; and I do hereby declare that the following is a full, clear, and exact description of the same, reference being had to the annexed drawings, and to the letters marked thereon.

My invention relates to certain improvements in that class of axles known as compensating-axles, and which are so constructed as to allow one wheel to move faster or slower than another upon the same axle for the purpose of turning curves. My improvement consists in forming two supports or journals upon the axle—one near the end and one near the middle—and upon these a sleeve turns. This sleeve has one wheel secured to it, and the other wheel is secured to the main axle. A screw-cap fits over the inner end of the sleeve, and holds it to its place; and through this cap is made a hole for lubricating, and to receive a screw for holding it to its place.

Referring to the drawings for a more complete explanation of my invention, Figure 1 is a plan showing my invention and a section of one of the sleeves and wheels.

A is a car-truck frame, supported by wheels B C, the ends of the axle D of which turn in the ordinary boxes beneath the frame or truck. Near one end of this axle, and at a point which will be within the wheel, I form a journal or enlarged portion, E. Another enlargement or collar, F, is formed near the middle of the axle, and upon these the hollow false axle or sleeve G turns. The wheel C is either cast with, keyed to, or otherwise properly secured to the sleeve, while the wheel B is attached to the shaft proper D in the usual way, by shrinking or otherwise. Thus it will be seen that the sleeve with the wheel will be enabled to turn independently of the other, and by the use of the two bearings or journals E and F the sleeve turns with a minimum of friction. In order to secure the sleeve to its place, I employ a screw-cap, H, which passes loosely over the collar F, and is secured upon the end of the sleeve, which, in the present case, is shown as abutting against the collar F, so that the cap H bears upon the collar. In order to retain the cap in place and prevent it from being turned off, I put in a holding-screw, I, which passes through the cap and the end of the sleeve, the hole of which serves as an opening through which to lubricate the bearings.

I do not claim, broadly, an axle adapted to permit the wheels to revolve independently of each other; but

Having thus described my invention, what I claim as new, and desire to secure by Letters Patent, is—

The axle D, provided with the enlarged journals E F, in combination with the sleeve G, which carries the wheel C, to turn independently of the wheel B, substantially as and for the purpose described.

In witness whereof I have hereunto set my hand and seal.

SAMUEL L. HARRISON. [L. S.]

Witnesses:
C. W. M. SMITH,
F. MADGE.